United States Patent
Chindapol et al.

(10) Patent No.: US 7,742,767 B2
(45) Date of Patent: Jun. 22, 2010

(54) RADIO COMMUNICATION USING OFDMA AND IFDMA

(75) Inventors: Aik Chindapol, Princeton, NJ (US); Martin Doettling, Neubiberg (DE); Thomas Hindelang, Fuerstenfeldbruck (DE); Andreas Lobinger, Miesbach (DE); Bernhard Raaf, Neuried (DE); Ingo Viering, Munich (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 582 days.

(21) Appl. No.: 11/415,435

(22) Filed: May 2, 2006

(65) Prior Publication Data

US 2007/0060161 A1    Mar. 15, 2007

Related U.S. Application Data

(60) Provisional application No. 60/676,999, filed on May 2, 2005.

(51) Int. Cl.
- H04L 5/00 (2006.01)
- H04L 27/26 (2006.01)
- H04J 14/00 (2006.01)
- H04W 16/12 (2006.01)

(52) U.S. Cl. ................ 455/443; 455/450; 370/329; 370/338

(58) Field of Classification Search .............. None
See application file for complete search history.

(56) References Cited

U.S. PATENT DOCUMENTS

| | | | | |
|---|---|---|---|---|
| 6,085,094 | A * | 7/2000 | Vasudevan et al. | 455/447 |
| 6,865,276 | B1 * | 3/2005 | Ljungberg et al. | 381/94.1 |
| 7,379,741 | B2 * | 5/2008 | Ahn et al. | 455/450 |
| 7,420,915 | B2 | 9/2008 | Murakami et al. | |
| 7,536,205 | B2 * | 5/2009 | Van Rensburg et al. | 455/562.1 |
| 2004/0001429 | A1 | 1/2004 | Ma et al. | |
| 2004/0213144 | A1 * | 10/2004 | Murakami et al. | 370/208 |
| 2005/0034053 | A1 | 2/2005 | Jacobsen et al. | |
| 2006/0067278 | A1 * | 3/2006 | Li et al. | 370/335 |
| 2006/0211426 | A1 * | 9/2006 | Costa et al. | 455/450 |

FOREIGN PATENT DOCUMENTS

| | | |
|---|---|---|
| CN | 1550080 | 11/2004 |
| WO | 2005/020613 | 3/2005 |

OTHER PUBLICATIONS

Sorger, U., "Interleaved FDMA," Spread-Spectrum Workshop, DLR Oberpfaffenhofen, Oct. 1996.

(Continued)

*Primary Examiner*—Rafael Pérez-Gutiérrez
*Assistant Examiner*—Frank Donado
(74) *Attorney, Agent, or Firm*—Staas & Halsey LLP (57) ABSTRACT

In a method for communicating by radio, a frequency band divided up into a plurality of subcarriers is used for the communication. Messages are sent from a base station to a user station and/or from the user station to the base station. Messages are processed at some times using a first FDMA method such as for example OFDMA and at other times using a second FDMA method such as for example IFDMA. A transmitter and a receiver implement the method.

8 Claims, 4 Drawing Sheets

OTHER PUBLICATIONS

Schnell, M. et al., "A Promising New Wideband Multiple-Access Scheme for Future Mobile Communications Systems," European Transactions on Telecommunications (ETT), vol. 10, No. 4, Jul./Aug. 1999, pp. 417-427.

Pietrzyk, S. et al., "Multiuser Subcarrier Allocation for QoS Provision in the OFDMA Systems," IEEE VTC, Spring 2002, Vancouver, Canada.

Kivanc, D. et al., "Computationally Efficient Bandwidth Allocation and Power Control for OFDMA," IEEE Transactions on Wireless Communications, vol. 2, No. 6, pp. 1150-1158, Nov. 2003.

Z. Cao et al., "Optimum Subcarrier Assignment for OFDMA Uplink" Asilomar Conference on Signals, Systems and Computers, Pacific Grove, CA, IEEE, US, vol. 1 of 2. Conf. 37, Nov. 9, 2003, pp. 708-712.

A. Filippi et al., "Low Complexity Interleaved Sub-carrier Allocation in OFDM Multiple Access Systems" Vehicular Technology Conference, Los Angeles, CA, IEEE, Sep. 26, 2004, pp. 1890-1893.

M. Schnell et al., "Application of IFDMA to mobile radio transmission" International Conference On Universal Personal Communications (ICUPC '98), Florence, Italy, IEEE, US, vol. 2, 5. Oct. 5, 1998, pp. 1267-1272.

T. Frank et al., "IFDMA - A Promising Multiple Access Scheme for Future Mobile Radio Systems" IEEE 16th International Symposium On Personal, Indoor and Mobile Radio Communications (PIMRC 2005). Berlin, Germany, IEEE, Sep. 11, 2005, pp. 1214-1218.

* cited by examiner

RADIO COMMUNICATION USING OFDMA AND IFDMA

CROSS REFERENCE TO RELATED APPLICATIONS

This application is based on and hereby claims priority to U.S. Provisional Patent Application No. 60/676,999 filed on May 2, 2005, the contents of which are hereby incorporated by reference.

BACKGROUND OF THE INVENTION

The invention relates to a method for communicating by radio, whereby a frequency band divided up into a plurality of subcarriers is used for the communication. The invention also relates to a transmitter and a receiver for implementing the method.

In radio communication systems, messages containing for example voice information, image information, video information, SMS (Short Message Service), MMS (Multimedia Messaging Service) or other data are transmitted between transmitter and receiver by way of a radio interface with the aid of electromagnetic waves. With regard to these radio stations, depending on the actual embodiment of the radio communication system these can be different types of user stations or network-side base stations. In a mobile radio communication system, at least some of the user stations are mobile radio stations. The emission of the electromagnetic waves takes place using carrier frequencies which lie in the frequency band provided for the system in question.

Mobile radio communication systems are often implemented as cellular systems, for example according to the GSM standard (Global System for Mobile Communication) or UMTS standard (Universal Mobile Telecommunications System) with a network infrastructure comprising for example base stations, facilities for checking and controlling the base stations and additional network-side facilities. Apart from these (supralocal) cellular, hierarchical radio networks organized on a wide scale, there are also wireless local networks (WLANs, Wireless Local Area Networks) which have a radio coverage area that is as a rule significantly more restricted in spatial terms. Examples of different standards for WLANs are HiperLAN, DECT IEEE 802.11, Bluetooth and WATM.

Access by user stations to the common transmission medium is controlled with regard to radio communication systems by multiple access methods/multiplexing methods (Multiple Access, MA). In the case of these multiple accesses, the transmission medium can be divided up between the user stations in the time range (Time Division Multiple Access, TDMA), in the frequency range (Frequency Division Multiple Access, FDMA), in the code range (Code Division Multiple Access, CDMA) or in the space range (Space Division Multiple Access, SDMA). Combinations of multiple access methods are also possible, such as for example the combination of a frequency range multiple access method with a code range multiple access method.

In order to achieve the most efficient possible transmission of data, the entire available frequency band is split up into a plurality of subcarriers (multicarrier method). The idea behind these FDMA methods is to convert the initial problem of transmitting a wideband signal into the transmission of a plurality of narrowband signals. Among other things, this has the advantage that the complexity required in the receiver can be reduced. In addition, the division of the available bandwidth into a plurality of narrowband subcarriers permits a significantly higher granularity of the radio resources, in other words the radio resources can be distributed over the data to be transmitted or over the user stations with a high level of refinement. In the case of transmissions having a variable data rate or in the case of burst-mode data traffic in particular, the available bandwidth can be efficiently utilized by allocating subcarriers to different user stations.

One example of a multicarrier transmission method is the OFDM (Orthogonal Frequency Division Multiplexing) system in which temporally approximately squarewave pulse shapes are used for the subcarriers. The frequency spacing of the subcarriers is chosen such that in the frequency range at the particular frequency at which the signal of a subcarrier is evaluated the signals of the other subcarriers exhibit a zero passage. The subcarriers are thus orthogonal with respect to one another. As a result of the generally extremely small spacing of the subcarriers and the narrowband nature of the signals transmitted onto the individual subcarrier in the case of OFDM, it is necessary to ensure that the transmission within the individual subcarriers is generally not frequency selective. This facilitates signal equalization at the receiver.

SUMMARY OF THE INVENTION

One possible object of the invention is to set down a method for communicating by radio, whereby a frequency band divided up into a plurality of subcarriers is available.

With regard to the method for communicating by radio, the inventors propose that a frequency band divided up into a plurality of subcarriers is used. Messages are sent from a base station to a user station and/or from the user station to the base station. At some times messages are processed using a first FDMA method and at other times messages are processed using a second FDMA method.

With regard to the base station, this is a network-side facility of a radio communication system, of a cellular or a local system for example. It is possible that the base station represents the only network-side radio station of the radio communication system, or that further network-side radio stations exist whose radio coverage areas border on the radio coverage areas of the base station. The user station can take the form of a mobile or stationary station. Communication takes place between the base station and the user station, whereby this can be communication in the upward (uplink) direction and/or in the downward (downlink) direction.

For the communication between the base station and the user station, at some times a first FDMA method such as OFDMA (Orthogonal Frequency Division Multiple Access) for example, and at other times a second FDMA method such as IFDMA (Interleaved Frequency Division Multiple Access) for example, is used. Both the first and also the second FDMA method can be combined with other multiple access methods, for example with code based multiple access methods.

For the communication, a frequency band subdivided into a plurality of subcarriers is available in the radio communication system under consideration. The division of the frequency band into the subcarriers is the same for transmission using the first FDMA method and for transmission using the second FDMA method. However, different subcarriers of the frequency band can be used for the two FDMA methods. As an alternative to this, it is possible for at least some subcarriers to be used at some times for the first FDMA method and at other times for the second FDMA method. The subcarriers can if necessary be reconfigured by the base station or by a network-side facility connected to the base station for the communication with user stations, in other words the allocation of the subcarriers to the FDMA methods can be changed.

The two FDMA methods are used not simultaneously but successively for the communication between the base station and the user station. Within the framework of the communication between the base station and the user station there exists at least one message which is processed both by the transmitter and also by the receiver in accordance with the first FDMA method, and at least one other message which is processed both by the transmitter and also by the receiver in accordance with the second FDMA method. This means that a switchover takes place between the two FDMA communication modes. This switchover preferably occurs while a connection is operating between the base station and the user station. Whereas the user station thus uses precisely one of the FDMA methods at one point in time, the base station can use both FDMA methods simultaneously for the communication with different user stations.

In a development, the base station sends signaling information to the user station as a request to switch from the first FDMA method to the second FDMA method or from the second FDMA method to the first FDMA method. The decision that the signaling information is to be sent to the user station or concerning the content of the signaling information is preferably made by the base station or by a network-side facility connected to the base station.

According to an advantageous development, a decision concerning the use of the FDMA method is made by using at least one measurement result. The decision is preferably made by the base station or by a network-side facility connected to the base station. Alternatively, the decision can also be made by the user station. With regard to the at least one measurement result, this can be the result of one or more measurements made by the user station and/or of one or more measurements made by the base station.

By preference, the at least one measurement result pertains to a radio channel quality concerning at least one subcarrier, such as for example a signal strength with regard to sending or receiving for one or more subcarriers currently used or not used for the communication between the base station and the user station. Additionally or alternatively, the at least one measurement result can pertain to a peak-to-average ratio of the user station. Additionally or alternatively, the at least one measurement result can pertain to an interference situation for the user station, such as for example the interference caused by adjacent base stations experienced by the user station or the interference caused by the user station to adjacent base stations. Additionally or alternatively, the at least one measurement result can pertain to an actual location of the user station, such as for example the distance of the user station from the base station or the actual location of the user station within the radio coverage area of the base station.

According to one embodiment, for the first FDMA method a first part of the subcarriers of the frequency band and for the second FDMA method a second part of the subcarriers not overlapping with the first part is used by the base station for the communication with user stations, whereby the first part comprises a plurality of blocks of subcarriers which are equidistant in the frequency range and have the same number of subcarriers. According to this embodiment, the base station uses some subcarriers for the first FDMA method and other subcarriers for the second FDMA method, whereby no overlapping occurs between the subcarriers of the first and the second FDMA method. Not all the subcarriers of the first FDMA method are adjacent to one another, rather there exists a plurality of equally sized blocks of subcarriers of the first FDMA method.

It is advantageous if a first part of the subcarriers of the frequency band and a second part of the subcarriers not overlapping with the first part is used by the base station for the communication with user stations, and at least some of the subcarriers of the first part and a third part of the subcarriers of the frequency band not overlapping with the first and the second part is used by a base station adjacent to the base station for the communication with user stations. In this situation, the radio cells or radio coverage areas of the two base stations border on each other. The two base stations share usage of at least some of the subcarriers, while other subcarriers exist which are used either by the base station or by the base station adjacent thereto.

It is also advantageous if for the first FDMA method the first part of the subcarriers and for the second FDMA method the second part of the subcarriers of the frequency band is used by the base station for the communication with user stations, and for the first FDMA method at least some of the subcarriers of the first part and for the second FDMA method the third part of the subcarriers of the frequency band is used by the base station adjacent to the base station for the communication with user stations. The two base stations share usage of at least some of the subcarriers of the first FDMA method, while there is no overlapping between the subcarriers of the second FDMA method used by the adjacent base station and the subcarriers of the first and second FDMA methods used by the base station.

The transmitter for a radio communication system includes a processor to process first messages to be sent when using a first FDMA method and for processing second messages to be sent when using a second FDMA method, whereby the processing of the first messages when using the first FDMA method takes place at the same time as or before or after the processing of the second messages when using the second FDMA method, as well as a transmitter to send the messages processed when using the first and/or the second FDMA method to a receiver.

The receiver for a radio communication system comprises a receiving unit for receiving messages from a transmitter, as well as a processor to process first messages received when using a first FDMA method and for processing second messages received when using a second FDMA method, whereby the processing of the first messages when using the first FDMA method takes place at the same time as or before or after the processing of the second messages when using the second FDMA method.

The transmitter and the receiver are particularly suitable for implementing the method, whereby this can also apply to the embodiments and developments. The transmitter may switch the message processing between the two FDMA methods, upon request if necessary.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
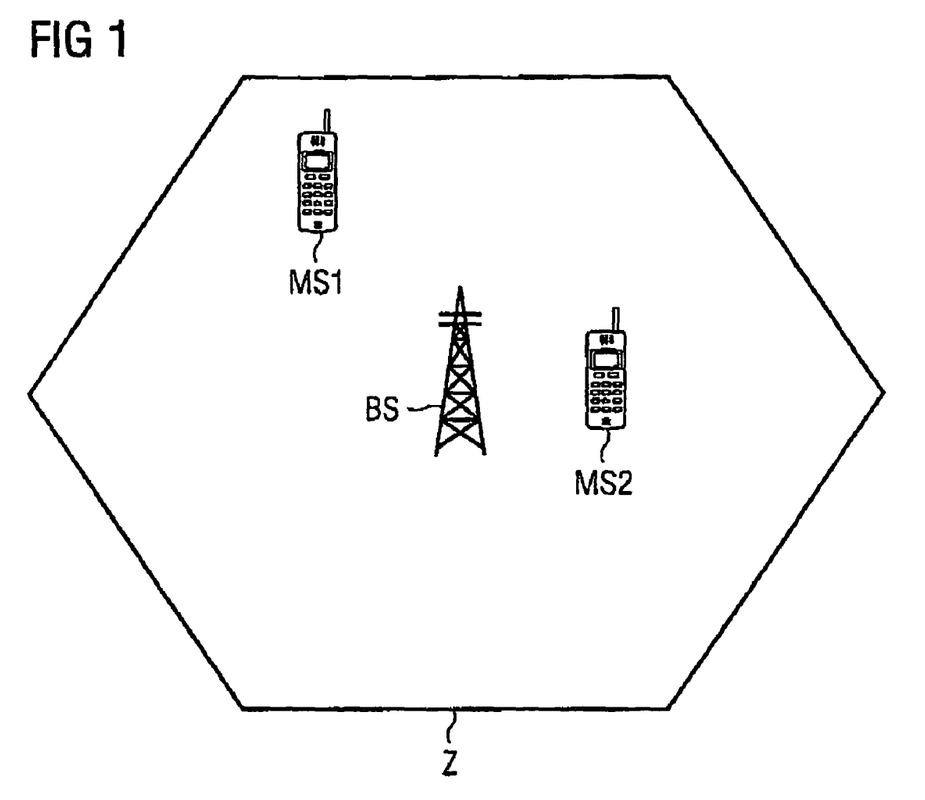
FIG. 1: shows a section of a radio communication system.

The section of a radio communication system illustrated in FIG. 1 shows the radio provision range or the radio cell Z of a base station BS, in which the user stations MS1 and MS2 are situated. The radio communication system in question is preferably a cellular system; alternatively, the base station BS in question can be a network-side radio facility of a local radio communication system. Further network-side facilities of the radio communication system are not shown in FIG. 1 for the sake of clarity.

The IFDMA method (Interleaved Frequency Division Multiple Access) and the OFDMA method (Orthogonal Frequency Division Multiple Access) are used for the communication between the base station BS and the user stations MS1 and MS2. Both transmission methods use narrowband subcarriers of a frequency band for the signal transmission. With regard to OFDMA, any subcarriers can be allocated to a user station, for example in the case of "frequency domain scheduling" OFDMA one or more blocks of adjacent subcarriers or in the case of "random tone allocation" OFDMA subcarriers with any frequency spacing selected in accordance with a random algorithm. With regard to IFDMA however, the subcarriers allocated to a user station exhibit a constant frequency spacing, in other words every n-th subcarrier is allocated to a user station. The smaller this frequency spacing, the greater is the maximum data rate available to a user station.

IFDMA is described for example in the following documents:

U. Sorger: "Interleaved FDMA", Spread-Spectrum Workshop, DLR Oberpfaffenhofen, October 1996.

M. Schnell, I. De Broeck, U. Sorger: "A Promising New Wideband Multiple-Access Scheme for Future Mobile Communications Systems", European Transactions on Telecommunications (ETT), Vol 10, No. 4, July/August 1999, pp. 417-427.

OFDMA is described for example in the following documents:

S. Pietrzyk, G. J. M. Janssen. "Multiuser subcarrier allocation for QoS provision in the OFDMA systems", IEEE VTC Spring 2002, Vancouver, Canada.

D. Kivanc, G. Li, H. Liu: "Computationally efficient bandwidth allocation and power control for OFDMA", IEEE Transactions on Wireless Communications, vol. 2, no. 6, pp. 1150-1158, 2003.

Figure 2:
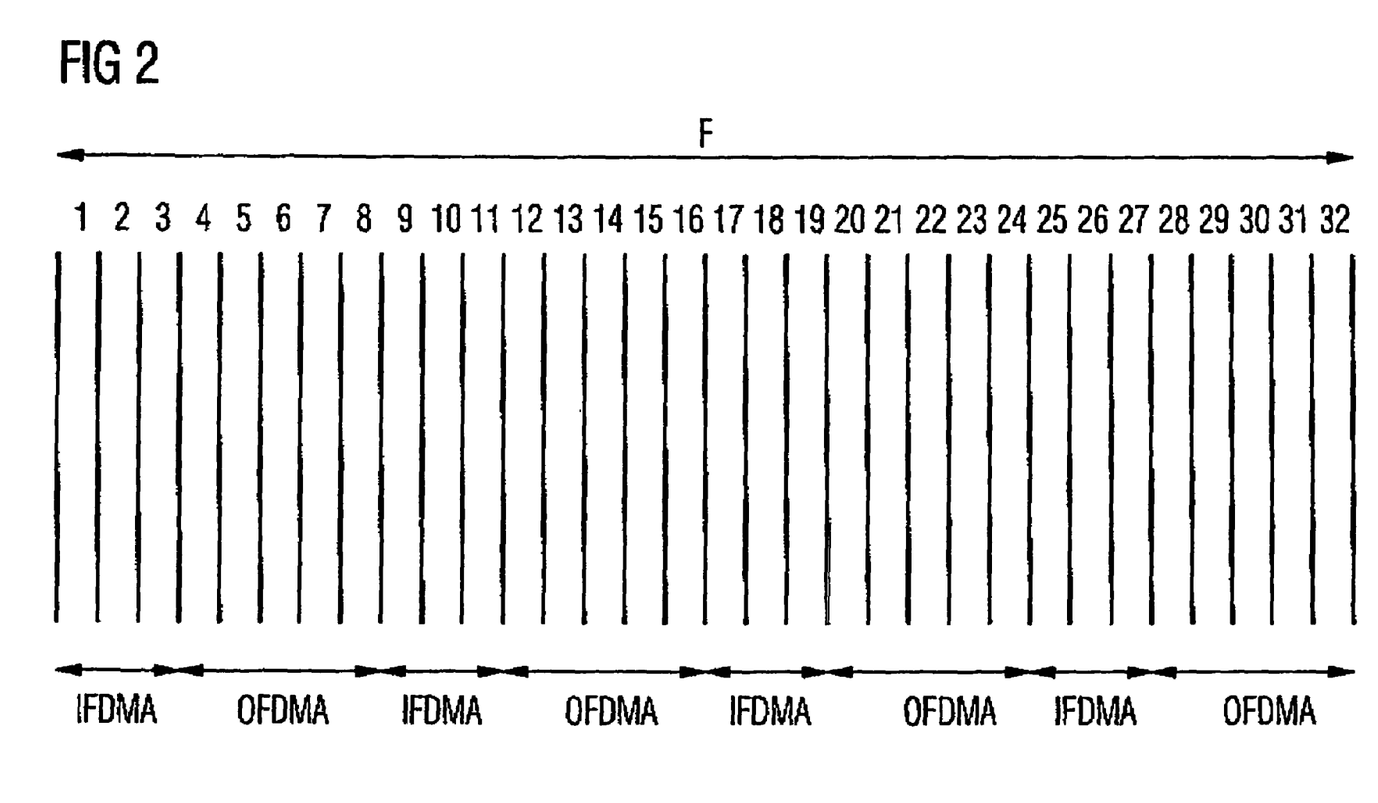
FIG. 2: shows use of a frequency band according to one embodiment of the invention.

FIG. 2 shows a frequency band F used by the base station BS for the communication with user stations, which is divided into 32 equidistant subcarriers, numbered with the numerals 1 to 32. The subcarriers 1 to 3, 9 to 11, 17 to 19 and 25 to 27 are used for the communication when using IFDMA, the other subcarriers 4 to 8, 12 to 16, 20 to 24 and 28 to 32 are used for the communication when using OFDMA. This allocation of the subcarriers to OFDMA or IFDMA can be valid for message transmission both in the uplink direction and also in the downlink direction. Alternatively, it is possible that different subcarriers are allocated to the two transmission methods for the uplink and downlink directions. Each of the subcarriers is used exclusively for one of the transmission methods. For communication purposes when using IFDMA, for example the subcarriers 1 and 17 can be allocated to a user station, or the subcarriers 3, 11, 19 and 27. For communication purposes when using OFDMA, for example the subcarriers 4 to 8 or the subcarriers 7, 20 and 24 can be allocated to a user station.

As an alternative to the division of the frequency band F illustrated in FIG. 2 into a plurality of ranges in each case containing OFDMA subcarriers and IFDMA subcarriers, it is also possible to perform the division in such a manner that in each case a range containing OFDMA subcarriers and a range containing IFDMA subcarriers is present. Thus, the subcarriers 1 to 10 can be used for IFDMA and the remaining subcarriers 11 to 32 for OFDMA, for example.

Figure 3:
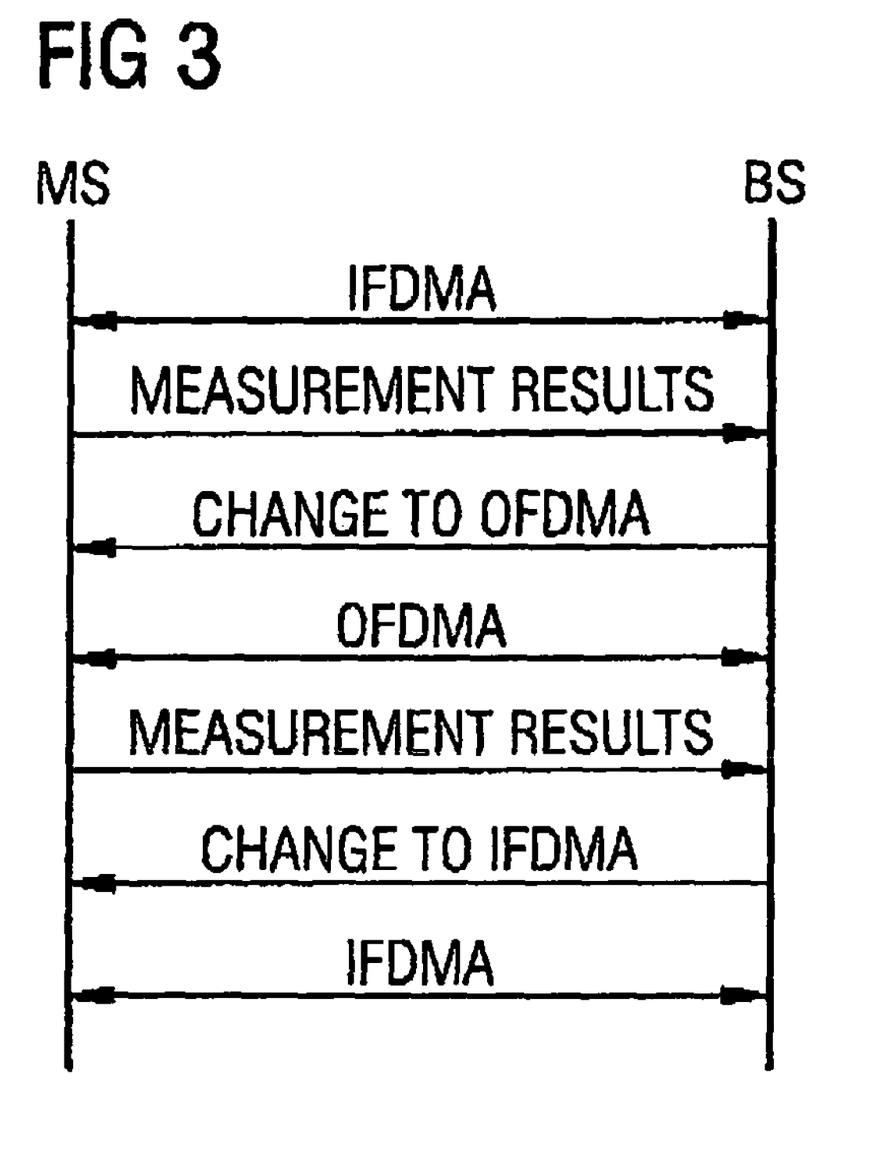
FIG. 3: shows a flowchart for the method according to one embodiment of the invention.

FIG. 3 shows the execution sequence of a method, in which a user station MS and a base station BS are communicating with one another. At the beginning an IFDMA communication takes place using IFDMA, whereby in this situation this can be a message send operation in the uplink and/or downlink direction. This is followed by the optional step of sending a MEASUREMENT RESULTS message from the user station MS to the base station BS. The MEASUREMENT RESULTS message contains results from measurements performed by the user station MS which are explained in detail later. The sending of the MEASUREMENT RESULTS message by the user station MS preferably occurs periodically. The base station BS or a network-side facility connected to the base station BS decides that with reference to the user station MS a switch is to be made from the IFDMA communication using IFDMA to an OFDMA communication using OFDMA. The base station BS sends a CHANGE TO OFDMA message to the user station MS which instructs the user station MS to use OFDMA in the following when processing messages received from the base station BS and/or when sending messages to the base station BS. Next, an OFDMA communication using OFDMA takes place, whereby in this situation this can be a message send operation in the uplink and/or downlink direction. The optional method step of sending a MEASUREMENT RESULTS message containing measurement results of the user station MS to the base station BS takes place again. The base station BS or a network-side facility connected to the base station BS decides that with reference to the user station MS a switch is to be made from the OFDMA communication using OFDMA to an IFDMA communication using IFDMA. The base station BS sends a CHANGE TO IFDMA message to the user station MS which instructs the user station MS to use IFDMA in the following when processing messages received from the base station BS and/or when sending messages to the base station BS. Following that an IFDMA communication using IFDMA takes place, whereby in this situation this can be a message send operation in the uplink and/or downlink direction.

The decision by the base station BS or a network-side facility connected to the base station BS concerning the transmission method to be used can be made on the basis of measurement results of the MEASUREMENT RESULTS message. In addition or as an alternative to measurement results determined by the user station MS, the decision can be made by using measurement results determined by the base station BS.

The base station BS thus communicates with the user station MS at some times by way of the IFDMA transmission method and at other times by way of the OFDMA transmission method. A switchover between the two methods occurs on receipt of a signaling message from the base station BS. The decision about the switch between the transmission methods is taken on the network side. The switch between IFDMA and OFDMA is user station specific, such that at a particular point in time both user stations which communicate with the base station BS by way of IFDMA and also user stations which communicate with the base station BS by way of OFDMA can be present. Whereas the user station MS thus utilizes only one of the transmission methods at a particular point in time for processing messages to be sent or received, in other words either IFDMA or OFDMA, the base station BS uses the two methods simultaneously, in other words some of the messages to be sent by the base station BS are processed using OFDMA and at the same time other messages to be sent by the base station BS are processed using IFDMA, or some of the messages received by the base station BS are processed using OFDMA and at the same time other messages received by the base station BS are processed using IFDMA.

With regard to packet switched communication between the user station MS and the base station BS, subcarriers are not allocated continuously to the user station MS but only for the transmission of one packet. Between different packets the subcarriers can be used for packet transmission between the base station BS and other user stations. The allocation of subcarriers to user stations preferably takes place quickly compared with the allocation of transmission methods to user stations since the decision concerning the transmission method to be used can depend on factors such as the current interference situation for example, which change slowly compared with the duration of a packet transmission. Radio resources are saved as a result of the separate signaling of the transmission method and of the subcarrier allocation since the signaling of the transmission method to be used may occur infrequently compared with the signaling of the subcarrier allocation. Furthermore, the signaling overhead for the subcarrier allocation is reduced through a preceding signaling of the transmission method since only a subset of the subcarriers is available for the particular transmission method.

The switch between OFDMA and IFDMA takes place as a function of measurement results, whereby in this situation these can be measurements performed by the user station affected by the switch, and/or by the base station. By preference the measurements pertain to the channel quality of a radio channel between the user station in question and the base station. The measurements relate to one or more subcarriers. The measurements can thus be performed on subcarriers currently allocated to the user station in order to obtain information about a currently used radio channel. Additionally or alternatively, measurements can be performed on subcarriers not currently allocated to the user station, with the result that information about the quality of a potential future radio channel can be obtained.

Examples of measurements concerning a channel quality are the receive strength of signals from the user station in the base station, or the receive strength of signals from base station in the user station, or the transmit power for sending messages from the user station to the base station, or the transmit power for sending messages from the base station to the user station. Particularly suitable are measurements which are performed among other things in order to decide about the execution of a handover, in particular a soft handover. As an alternative or in addition, the measurements can concern the interference situation which the user station experiences due to adjacent radio cells. In order to determine this variable, the user station measures the receive power of signals emitted by other base stations. In order to ascertain a suitable variable as a decision-making criterion as to whether a communication should take place using OFDMA or using IFDMA, different measurements or the respective results can be combined. A calculation of this (these) variable(s) can be performed by the user station in question or by the base station.

If the measurements yield the result that communication by way of the subcarriers of the one transmission method currently allocated to a user station is disadvantageous, for example because the radio channel is poor or because excessive interference from adjacent cells is present on these subcarriers, and/or if the measurements yield the result that communication by way of subcarriers of the other transmission method not currently allocated to the user station is advantageous or if applicable more advantageous, then the decision can be taken on the network side to switch from the first to the second transmission method. For example, a block of subcarriers for the communication using OFDMA can be allocated to a user station and the measurements used to determine that distributed subcarriers used for IFDMA would be more suitable, such that a switch from OFDMA to IFDMA occurs as a result of these measurements.

The switch from OFDMA to IFDMA or vice versa can in particular be caused by the actual location of a user station within the radio coverage area of a base station. According to FIG. 1, the user station MS1 is currently located in the vicinity of the edge of the radio provision range Z of the base station BS while the user station MS2 is currently located in the vicinity of the base station BS. As a result of this different distance of the user stations MS1 and MS2 from the base station BS, different conditions exist for the user stations MS1 and MS2 in respect of the radio transmission. In the downlink direction, in other words with reference to the transmission from the base station BS to a user station MS1 or MS2, a large path loss is present for user stations located at a great distance from their own base station BS. Moreover, these user stations experience more interference from adjacent base stations which may be present than user stations in the vicinity of their own base station. In the uplink direction, in other words with reference to the transmission from a user station MS1 or MS2 to the base station BS, a larger path loss is likewise present for user stations located at a great distance from their own base station BS. Moreover, these user stations generate more interference for adjacent base stations which may be present, in other words they increase the intercell interference.

Furthermore, the peak-to-average ratio, in other words the ratio of the transmit power at a transmit power peak to the average transmit power of a user station, for user stations at a great distance from their own base station BS is more important than for user stations at a small distance from their own base station BS since more distant user stations frequently emit at maximum transmit power. The peak-to-average ratio should not be excessively great for user stations at a great distance from their own base station BS since—as a result of the maximum achievable transmit power for a user station—given a high transmit power and high peak-to-average ratio insufficient transmit power is available for the peaks.

Furthermore, the frequency repetition spacing is of great importance for user stations in the vicinity of the boundary between the radio cells of two base stations: at a frequency repetition spacing of 1, the same radio frequencies are used in adjacent radio cells. If a user station communicates on a subcarrier which is used with a frequency repetition spacing of 1, then the user station will experience strong interference from the adjacent cell or causes strong interference in its adjacent cell.

As a result of the different situations described in which user stations are situated in the vicinity of the base station on the one hand and user stations are situated at the edge of the radio coverage area of the base station on the other hand, it is advantageous for these user stations to use different transmission methods. The use of IFDMA is thus suitable for user stations which are located a great distance from their base station, and the use of OFDMA is suitable for user stations which are located in the vicinity of their base station. This is advantageous in particular because the use of IFDMA results in a low peak-to-average ratio. Accordingly, the subcarriers 1 to 3, 9 to 11, 17 to 19 and 25 to 27 shown in FIG. 2 can be used for communication by user stations at the edge of a radio cell, and the other subcarriers 4 to 8, 12 to 16, 20 to 24 and 28 to 32 can be used for communication by user stations in the remainder of the radio cell. In this manner, the type of transmission method depends on the actual location of a user station or on the distance of a user station from its own base station.

The decision as whether a user station is situated at the edge of a radio cell or in the vicinity of the base station of the radio cell can be made by measurements of user stations and/or of base stations. In this situation, for example, a direct positional determination can take place, such as GPS (Global Positioning System), AGPS (Assisted Global Positioning System), measurements of signal propagation times for positional determination or other positional determination methods. It is also possible to not determine the location of a user station directly but to perform the aforementioned measurements of channel quality and/or interference situation which indirectly yield information about the actual location of a user station since a user station generally experiences a deterioration in the radio channel and an increase in interference from adjacent cells as its distance increases from its own base station.

Threshold values are advantageously employed in order to decide whether OFDMA or IFDMA is to be used for a user station. A decision is previously taken as to which measurements should be used for deciding on the transmission method to be used. Following that, threshold values are specified for the measurement results or for variables calculated from the measurement results, with which threshold values the measurement results or the variable(s) calculated from the measurement results are compared. Exceeding or not reaching the threshold values represents the criterion governing the decision in relation to the transmission method to be used.

As an alternative or in addition to using threshold values, the measurement results of the different user stations which are relevant to the decision between the transmission methods can be sorted. The user stations are placed in a sequence and the decision concerning the transmission method to be used can be made in accordance with this sequence. If, for example, the interference from adjacent cells is the decisive criterion in the decision for OFDMA or IFDMA, the decision for OFDMA or IFDMA is made first for the user stations most severely affected by the interference and the corresponding OFDMA or IFDMA subcarriers are allocated in order that the situation does not occur whereby no radio resources are available for these user stations for the transmission method which is more suitable in respect of the interference.

It is advantageous if a different frequency repetition spacing is employed for those subcarriers which are used for the communication by user stations at the edge of a radio cell than that for those subcarriers which are used for the communication by user stations in the remainder of the radio cell. If the conditions for switching between OFDMA and IFDMA are determined as described above such that IFDMA is used for user stations at the edge of the radio cell and OFDMA is used for user stations in the remainder of the radio cell, then different frequency repetition spacings are associated with the two transmission methods OFDMA and IFDMA. In the example shown in FIG. 2, a frequency repetition spacing of 1 can be used for the OFDMA subcarriers, in other words adjacent base stations use the same subcarriers for the communication using OFDMA. A greater frequency repetition spacing should be chosen for the IFDMA subcarriers since these subcarriers are deployed at the edge of the cells. In this manner, the IFDMA subcarriers can be divided up among the base stations without directly adjacent base stations using the same IFDMA subcarriers. In idealized hexagonal radio cells the subcarriers 1, 9, 17 and 25 from FIG. 2 can be used for IFDMA by a first group of base stations, the subcarriers 2, 10, 18 and 26 by a second group of base stations, and the subcarriers 3, 11, 19 and 27 by a third group of base stations, whereby all the base stations of a group are not directly adjacent. This corresponds to a frequency repetition spacing of 3 for the IFDMA subcarriers. The combination of IFDMA with a large frequency repetition spacing and OFDMA with a small frequency repetition spacing is the choice since there would be significant degradation of transmission quality at the cell edge when using IFDMA with a small frequency repetition spacing. This problem does not occur with OFDMA, particularly in the case of "random tone hopping". On the other hand, IFDMA has a low peak-to-average ratio which means that the use of IFDMA at the cell edge is advantageous.

An estimate in respect of the gain in capacity achieved by using a larger frequency repetition spacing for some subcarriers can be produced according to Shannon's formula. This takes into consideration the fact that when a smaller frequency repetition spacing is used, although a greater bandwidth is available per cell, the capacity is however reduced as a result of increased interference.

As an example of the division of the subcarriers into OFDMA subcarriers and IFDMA subcarriers we shall consider a 10 MHz wide frequency band which is divided into 384 equidistant subcarriers. Let the maximum number of subcarriers which can be allocated to a user station for IFDMA be 32. According to 384÷32=12 the frequency spacing between the IFDMA subcarriers at maximum IFDMA data rate is 12 subcarriers. If 50% of the subcarriers are used for OFDMA and 50% for IFDMA, then 192 subcarriers each are available for OFDMA and IFDMA. This means, as 192÷32=6, that 32 IFDMA subcarriers in each case can be allocated simultaneously to at least 6 user stations in one radio cell. If a frequency repetition spacing of 3 is used for the IFDMA subcarriers, then only 192÷3=64 IFDMA subcarriers are available to a base station. The subcarriers of the frequency band can be allocated as follows to the transmission methods and radio cells: 6 IFDMA subcarriers follow one another directly, whereby the cell under consideration uses for example the first and the second of these IFDMA subcarriers, then follow 6 OFDMA subcarriers which each cell uses for OFDMA, then follow a further 6 IFDMA subcarriers directly after one another, whereby the cell under consideration again uses the first and the second of these IFDMA subcarriers, then follow 6 OFDMA subcarriers which each cell uses for OFDMA, etc.

The two transmission methods OFDMA and IFDMA can in each case be combined with further methods for user separation, such as for example spatially directional emission and/or the use of user-specific codes. With regard to IFDMA, this is particularly advantageous because a minimum number of subcarriers should be allocated to a user station in IFDMA in order to allow the advantages of IFDMA to take effect. Through the use of codes it is possible to reduce a high data rate which results from a high minimum number of subcarriers. In this manner, a higher granularity of the radio resources is introduced with IFDMA.

If user stations exist for which no clear decision in favor of one of the transmission methods OFDMA or IFDMA can be taken as a result of the measurements, then a combination involving the transmission methods OFDMA and IFDMA can be implemented for these user stations. Such a combination can for example include a user station being allocated subcarriers which are used for OFDMA, and furthermore being allocated subcarriers which are used for IFDMA. These subcarriers or the transmission methods associated with them can be utilized simultaneously or successively. This procedure has the advantage described in the following: user stations which are situated in the cell edge zone suffer severe interference if the subcarriers allocated to them are used in an adjacent cell. By allocating subcarriers which are not used in the adjacent cell, it is possible to achieve a significant reduction in this interference. On the other hand, user stations which are situated in an intermediate zone between the cell edge and the closer vicinity of the base station suffer reduced interference from the adjacent cell. Although the allocation of subcarriers not used in the adjacent cell to these user stations also results in an increase in transmission quality for these user stations, it is however possible that the transmission conditions consequently become better than would actually be required. If for example 50% non-exclusive subcarriers are allocated to these user stations, in other words subcarriers which are also used in the adjacent cell, and 50% exclusive subcarriers, in other words subcarriers which are not used in the adjacent cell, then only half of the subcarriers allocated to the user station are adversely affected by interference from the adjacent cell. The disruption is thus halved on average. The radio resources are used sparingly, since the user stations in the intermediate zone occupy radio resources used only partially exclusively in their own radio cell. As a result it is possible to allocate acceptable subcarriers to a larger number of user stations in respect of the transmission quality. Advantageously, the closer user stations are located to the cell edge or the greater the effect of the interference from the adjacent cell, the more radio resources used exclusively in their own radio cell are allocated to the user stations. The use of the exclusive and non-exclusive subcarriers by the user stations in this situation can occur simultaneously or in time division multiplexing.

The subcarriers used in a cell for the two transmission methods OFDMA and IFDMA can be changed with time. If it is determined, for example, that the transmission conditions for a large number of user stations when using IFDMA are more favorable than when using OFDMA, then subcarriers which were previously being used for OFDMA can be used for IFDMA. The decision as to which subcarriers are allocated to OFDMA or IFDMA can be taken by the relevant base station or by a central facility, such as for example in the case of UMTS by an RNC (Radio Network Controller). In this manner it is possible to achieve load balancing between for example user stations at the edge of a radio cell and user stations in the center of the radio cell.

Figure 4:
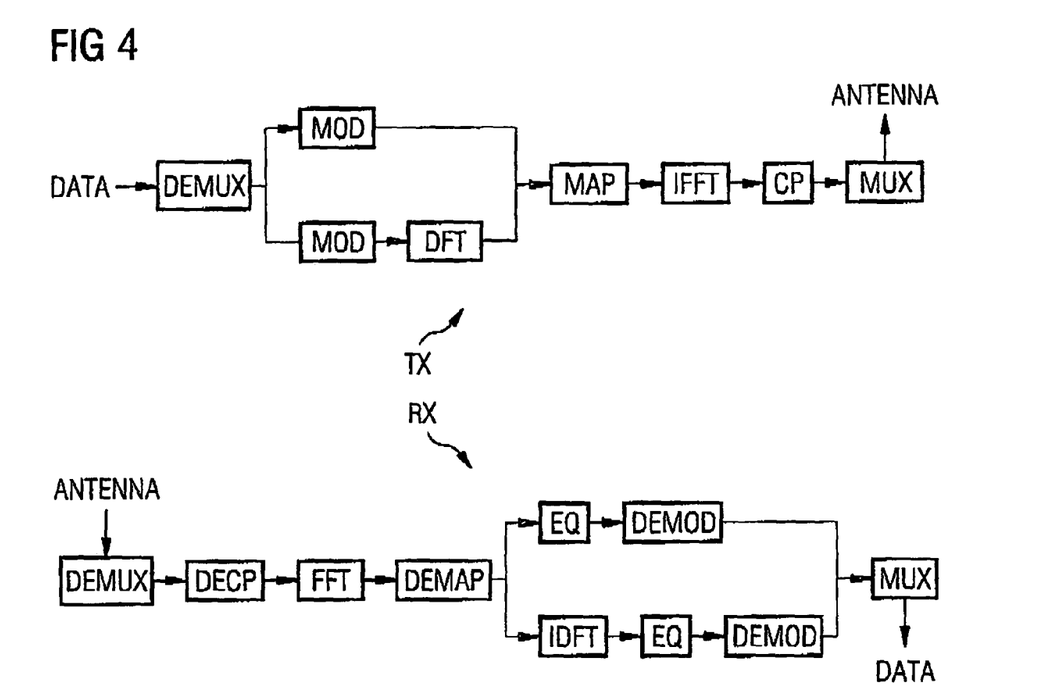
FIG. 4: shows a transmitter according to one embodiment of the invention and a receiver according to one embodiment of the invention.

The upper part of FIG. 4 schematically illustrates the structure of a transmitter TX for switching over between OFDMA and IFDMA, and the lower part schematically illustrates the structure of a receiver RX for switching over between OFDMA and IFDMA. With regard to the transmitter TX, bits to be sent DATA are demultiplexed in the DEMUX component, in other words the temporally serial data stream of bits is divided up into parallel blocks which are each processed block by block in further components. Here, when using OFDMA, a block of information bits passes into the upper branch following the DEMUX component and, when using IFDMA, into the lower of the two branches following the DEMUX component. In both branches a modulation during which symbols are formed through combination of bits takes place in the MOD component. In the IFDMA branch, after the symbol formation, a discrete Fourier transformation into the frequency range takes place in the DFT component. In the MAP component, each block of symbols is allocated to a subcarrier and the other subcarriers are set to zero. Next, an inverse Fourier transformation of the symbol sequence into the time range is performed in the IFFT component. The following CP component adds cyclical prefixes. The MUX component performs a conversion of the blocks into serial data before sending occurs through the antenna ANTENNA.

Before sending occurs through the antenna ANTENNA an amplification takes place. The same amplifier can be used for OFDMA and IFDMA.

By way of the antenna ANTENNA the receiver RX receives a serial baseband signal which is subjected to a serial-to-parallel conversion in the DEMUX component. The DECP component removes the cyclical prefixes. After the Fourier transformation into the frequency range in the FFT component, the information for the different subcarriers is converted into blocks in the DEMAP component. When OFDMA is used blocks pass into the upper branch following the FFT component and when IFDMA is used into the lower of the two branches following the FFT component. In each of the two branches there is a separate equalizer EQ because the equalizer for the OFDMA processing is generally implemented more simply than for the IFDMA processing. Prior to the equalization, an inverse discrete Fourier transformation takes place in the IDFT component for the IFDMA symbols. In both branches the symbols are demodulated in the DEMOD component, in other words converted into bits before the IFDMA bits and the OFDMA bits are multiplexed in the MUX component. The bit sequence DATA resulting from this is then delivered for decoding.

If the transmitter TX and the receiver RX are part of a user station, then the upper branch is used for OFDMA communication and the lower branch is used for IFDMA communication. If the user station receives a signaling message informing it that the transmission method is being switched, a switchover takes place to whichever is the other branch. If OFDMA is being used on some subcarriers at the same time as IFDMA is being used on other subcarriers, then the OFDMA symbols and the IFDMA symbols are fed into the corresponding branches and processed simultaneously. The same also applies accordingly to a base station which as a rule communicates simultaneously with some user stations by way of OFDMA and with other user stations by way of IFDMA.

The foregoing description is with reference to the use of the two transmission methods OFDMA and IFDMA. Alternatively, instead of OFDMA and/or IFDMA, other FDMA transmission methods can also be employed. Furthermore, IFDMA can be employed with a subcarrier spacing of 1, corresponding to a single carrier method. As an alternative to using IFDMA at the cell edge, it is also possible to use a subcarrier hopping method at the cell edge because the interference relating to the adjacent cell can be reduced by this.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method of communicating by radio, comprising:
sending messages using a frequency band (F) divided into a plurality of subcarriers, either from a base station (BS) to a user station or from the user station to the base station (BS); and
processing the received messages using either a first or a second Frequency Division Multiple Access (FDMA) method, wherein
the plurality of subcarriers are divided into first, second and third discrete groups,
first and second adjacent base stations are in communication with the user station, the first base station using the first, second and third discrete groups of subcarriers, the second base station using the first and third discrete groups of subcarriers, and
a different frequency repetition spacing is employed for those subcarriers which are used for communication by the user station at an edge of a radio cell than for the subcarriers which are used for communication by the user station in a remainder of the cell.

2. A method according to claim 1, wherein the base station (BS) sends to the user station signaling information as a request to change from the first FDMA method to the second FDMA method or from the second FDMA method to the first FDMA method.

3. A method according to claim 1, wherein the first or the second FDMA method is used depending on at least one measurement result.

4. A method according to claim 3, wherein the at least one measurement result is at least one of a radio channel quality relating to at least one subcarrier, a peak-to-average ratio of the user station, an interference situation of the user station, and an actual location of the user station.

5. A method according to claim 1, wherein, when the first FDMA method is used, a first group of subcarriers is used, and when the second FDMA method is used, a second group of subcarriers different than the first group is used, and
wherein the first group is a plurality of blocks of the subcarriers which are equidistant in the frequency band, and each block has an equal number of subcarriers.

6. A method according to claim 1, wherein,
when the first FDMA method is used, the first group of subcarriers is used, and when the second FDMA method is used, the second group of subcarriers different from the first group is used, and
wherein the second base station (BS) adjacent to the first base station (BS) uses at least some of the subcarriers of the first group when the first FDMA method is used and at least some of the third group of subcarriers when the second FDMA method is used to communicate with the base station.

7. A transmitter for a radio communication system, comprising:
a processor processing the first messages to be sent when using a first Frequency Division Multiple Access (FDMA) method and processing second messages to be sent when using a second FDMA method; and
a sending unit sending the processed messages to a receiver via a frequency band (F) subdivided into a plurality of subcarriers, wherein
the plurality of subcarriers are divided into first, second and third discrete groups,
first and second adjacent base stations are in communication with the user station, the first base station using the first, second and third discrete groups of subcarriers, the second base station using the first and third discrete groups of subcarriers, and
a different frequency repetition spacing is employed for those subcarriers which are used for communication by the user station at an edge of a radio cell than for the subcarriers which are used for communication by the user station in a remainder of the cell.

8. A receiver for a radio communication system, comprising:
a receiving unit receiving messages from a transmitter via a frequency band (F) subdivided into a plurality of subcarriers, the messages including first messages processed using a first Frequency Division Multiple Access (FDMA) method and/or second messages processed using a second FDMA method; and
a processor processing first messages received using a first FDMA method and processing second messages when using a second FDMA method, wherein
the plurality of subcarriers are divided into first, second and third discrete groups,
first and second adjacent base stations are in communication with the user station, the first base station using the first, second and third discrete groups of subcarriers, the second base station using the first and third discrete groups of subcarriers, and
a different frequency repetition spacing is employed for those subcarriers which are used for communication by the user station at an edge of a radio cell than for the subcarriers which are used for communication by the user station in a remainder of the cell.

* * * * *